United States Patent Office 3,162,678
Patented Dec. 22, 1964

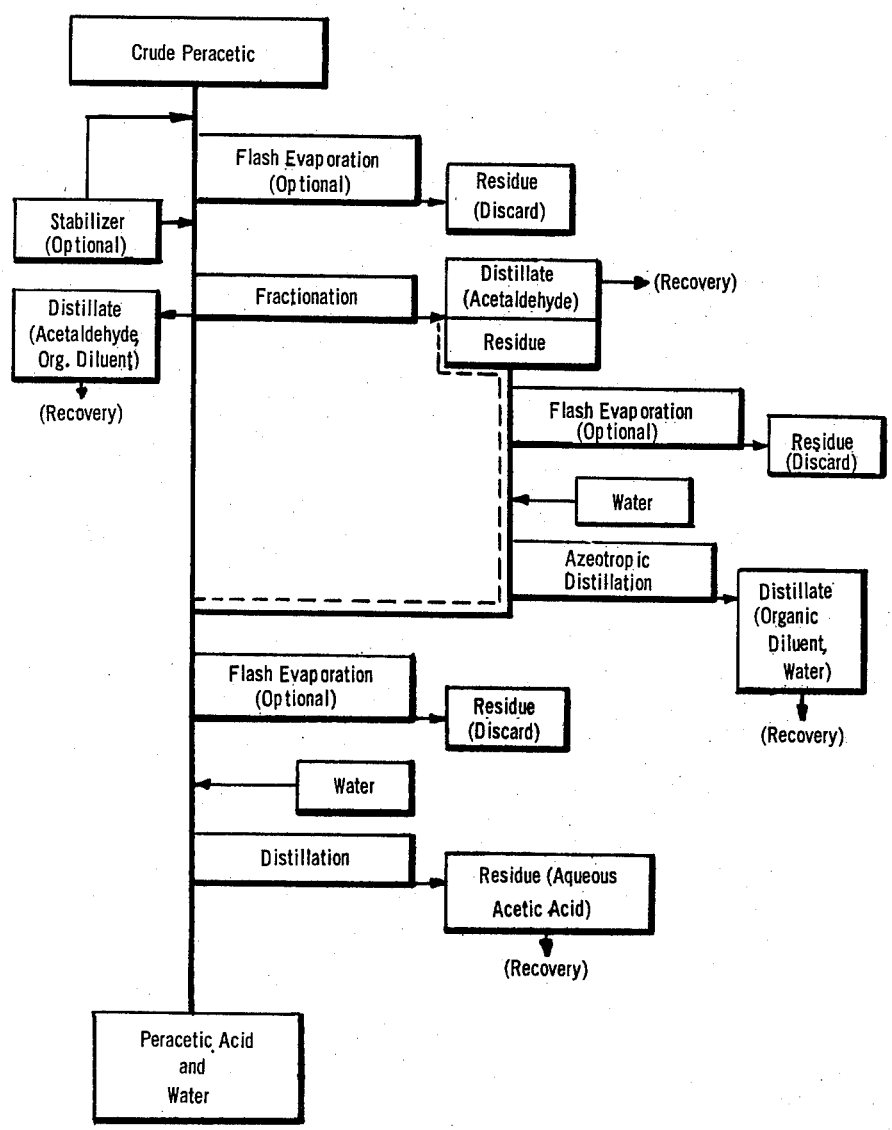

3,162,678
AQUEOUS PERACETIC ACID RECOVERY
Ernest R. Hayes, Shawinigan South, Quebec, Canada, assignor to Shawinigan Chemicals Limited, Montreal, Quebec, Canada, a corporation of Canada
Filed Oct. 23, 1961, Ser. No. 146,709
10 Claims. (Cl. 260—502)

This invention relates to a process for the recovery of peracetic acid from crude solutions. More particularly, this invention relates to a process for the recovery of concentrated aqueous solutions of peracetic acid from crude solutions obtained by catalytic oxidation of acetaldehyde.

The known processes for recovering peracetic acid from crude solutions containing the same are unsatisfactory. In one of these, for example, a 25–30% aqueous solution is obtained. But, according to this process, it is not possible to attain any notewothy concentration increase of peracetic acid in the distillate obtained by vacuum distillation of a 25% aqueous peracetic acid solution. Other methods are known that provide concentrated peracetic acid in an organic solvent. This solvent adds to the cost of peracetic acid and, furthermore, is not always the desired solvent for the specific reaction in which peracetic acid is to be used. All the prior art methods for recovering concentrated peracetic acid disclose processes in which peracetic acid decomposes during the recovery, and give an end product which is unstable. The production of peracetic acid is often accompanied by the formation of extraneous organic peroxides as by-products. Most of these, especially diacetyl peroxide, are highly explosive, even at low concentrations.

It is an object of the present invention to provide a process for preparing stable aqueous solutions of peracetic acid. It is another object of this invention to provide a safe, economical process for the recovery of a concentrated aqueous solution of peracetic acid from a crude solution containing extraneous explosive organic peroxide by-products. It is a further object of this invention to recover peracetic acid from dilute solution in good yields by a process which is less expensive and more convenient to operate than the known processes. Other objects and advantages of the present invention will become apparent from the description to follow.

Crude peracetic acid can be obtained by oxidation of acetaldehyde in a nonreactive organic liquid diluent, for example, alkyl esters (especially methyl, ethyl, or isopropyl acetate), ketones, especially acetone and methyl ethyl ketone, and volatile liquid hydrocarbons, in the presence of a catalyst. The crude solutions thus obtained usually contain 6.0–17% peracetic acid, 0.5–2.0% unreacted acetaldehyde, 0.1–2.5% acetic acid, 0.1–0.5% extraneous organic peroxide material, and 80–91% nonreactive organic liquid diluent. If a metal compound catalyst is used, the crude solutions would also contain this compound in catalytic quantities.

In its broadest aspect, the invention consists in a process for the recovery of a concentrated aqueous solution of peracetic acid from a crude mixture containing acetaldehyde, peracetic acid, acetic acid, extraneous organic peroxide material, and a nonreactive organic liquid diluent satisfying at least one of the following two conditions: (a) having a boiling point at atmospheric pressure between 40° C. and 110° C. and (b) forming with water a binary azeotrope of boiling point between 40° C. and 110° C. at atmospheric pressure, said process comprising (1) separating acetaldehyde and the nonreactive organic liquid diluent as distillate from a residue of peracetic acid, acetic acid, and the organic peroxide material by vacuum fractional distillation, (2) adding water to the residue in an amount to provide a mole ratio of water to peracetic acid of from 2.0 to 8.5, (3) distilling said aqueous residue under vacuum whereby at least part of the organic peroxide materal present in the mixture is hydrolyzed, and (4) recovering a concentrated aqueous solution of peracetic acid as distillate and aqueous acetic acid as residue, said process being carried out at an absolute pressure below 200 mm. Hg.

The invention further consists in a process for the recovery of a concentrated aqueous solution of peracetic acid as hereinbefore described, said process further comprising adding a stabilizer for peracetic acid to the crude mixture.

One modification of the invention consists in a process for the recovery of a concentrated aqueous solution of peracetic acid from a crude mixture containing acetaldehyde, peracetic acid, acetic acid, metal compound catalyst, extraneous organic peroxide material, and a nonreactive organic liquid diluent as hereinbefore described, said process comprising flash evaporating the crude mixture under vacuum to separate therefrom the metal compound catalyst as residue, and treating the evaporated product as hereinbefore described.

If the nonreactive organic liquid diluent referred to hereinbefore forms with water a binary azeotrope of boiling point between 40° C. and 110° C. at atmospheric pressure, a convenient procedure consists in fractionating the crude mixture under vacuum to separate a distillate of acetaldehyde from a residue of peracetic acid, acetic acid, organic liquid diluent, and extraneous organic peroxide material, adding water to said residue in sufficient amount to form, upon vacuum distillation, said azeotrope of organic liquid diluent and water, azeotropically distilling said aqueous residue under vacuum whereby some of the organic peroxide material present in the residue is hydrolyzed, recovering a distillate of said azeotrope and a residue of peracetic acid, acetic acid, water, and organic peroxide material, and treating said residue as described hereinbefore.

The process may be better understood with reference to the accompanying drawing which represents a diagrammatic flow sheet of the process of the invention, including the optional and alternative features mentioned above.

As shown in the drawing, a crude mixture containing acetaldehyde, acetic acid, peracetic acid, nonreactive organic liquid diluent, and extraneous organic peroxide material is preferably stabilized by addition of a stabilizer for peracetic acid as defined hereinafter. Optionally, if the crude mixture contains traces of a metal compound catalyst, the unstabilized crude mixture is preferably passed through a flash evaporator maintained at a constant temperature and under vacuum. This flash evaporation separates the metal compound catalyst from the crude mixture. Both stabilization and flash evaporation are optional although direct liquid feed of the crude mixture, if it contains traces of a metal compound catalyst, to the following fractionation, is not recommended because of the very high instability of this untreated crude mixture. On the other hand, a great advantage resides in stabilizing the crude mixture, because this stabilized crude mixture can be fed to the following fractionation step as direct liquid feed. When the crude mixture is both stabilized and subjected to flash evaporation before fractionation, the order in which these two steps are carried out is immaterial.

The initial crude mixture or the vaporized products from the flash evaporation of this initial crude mixture or the stabilized crude mixture, as may be the case, is fractionally distilled in one or more fractional distillation columns from which acetaldehyde and the nonreactive organic liquid diluent are recovered by means of a suitable condenser system. The residue from such fractional distillation contains peracetic acid, acetic acid, and organic peroxide material. The residue may also contain traces of metal compound catalyst, and, in that case, it should preferably be passed through a flash evaporator under vacuum, at this stage, to separate these traces of metal compound catalyst from the mixture of peracetic acid, acetic acid, and extraneous organic peroxide material. As shown in the drawing, water is then added to this mixture in suitable amounts either before or during the following distillation which is also carried out under vacuum. Peracetic acid and water are recovered as distillate from this distillation, while acetic acid is recovered as residue. The amount of water to be added should be sufficient to provide a mole ratio of water to peracetic acid of from 2.0 to 8.5. Preferably, water is added in suitable proportions to provide a mole ratio of water to peracetic acid of from 3.0 to 4.0. The organic peroxide material is hydrolyzed to a large extent during this distillation. Traces of extraneous organic peroxide material may still be found in the distillate. These traces present no hazard and, being in the presence of water, are further hydrolyzed on standing.

As shown by the dotted line in the drawing, if the nonreactive organic liquid diluent in the initial crude mixture can form with water a binary azeotrope of boiling point between 40° C. and 110° C. at atmospheric pressure, it is preferred initially to distill off only acetaldehyde; after addition of suitable amounts of water to the residue of such distillation, an azeotropic distillation of this aqueous residue under vacuum gives a distillate consisting of said diluent-water azeotrope, and a residue containing peracetic acid, acetic acid, organic peroxide material, and some water. This residue can be distilled in the same manner as hereinbefore described to obtain a distillate of peracetic acid and water. If the organic liquid diluent is separated by azeotropic distillation from a crude mixture initially containing traces of a metal compound catalyst, the flash evaporation is preferably carried out at a prior stage in the process.

It was found that very high recoveries of peracetic acid are obtainable when the present process is operated at absolute pressures below 70 mm. Hg. The present process is operable at absolute pressures up to 200 mm. Hg although pressures below 70 mm. Hg are preferred. At the temperatures corresponding to pressures higher than 200 mm Hg, peracetic acid decomposes or otherwise reacts so as to make the process unsafe and impractical.

One of the important features of the invention is the convenience of control of the concentration of undesirable extraneous organic peroxide material, especially diacetyl peroxide, in these distillation steps, by hydrolyzing at least 50–80% of this peroxide material present in the crude. The trade quantities of the peroxide that distill over and are recovered with the peracetic acid and water are further hydrolyzed by the water present e.g. to peracetic acid and acetic acid in the case of diacetyl peroxide.

Another important feature of the invention is the marked increase in the recovery of peracetic acid achieved by adding a stabilizer for peracetic acid directly to the crude solution to be rectified, in which several compounds contribute to the enhanced instability of the peracetic acid, e.g. metal catalyst and acetaldehyde. Although $\alpha,\alpha'$-dipicolinic acid and other compounds known as peracetic acid stabilizers produce some stabilization, exceptionally high yields are obtained by using picolinic acid, quinaldic acid, or 8-hydroxy quinoline as stabilizers for the crude. These compounds have a much greater effect on crude stability during distillation than other peracetic acid stabilizers.

The present process also permits the easy recovery of the nonreactive organic solvent used in the preparation of peracetic acid.

In the following 12 examples, the Examples 1 to 11 inclusive illustrate the various alternative modifications of the first part of the invention which includes the separation of acetaldehyde and nonreactive organic liquid diluent as distillate from a residual mixture of peracetic acid, acetic acid, and extraneous organic peroxide material. Example 12 illustrates the second part of the invention in which a residual mixture of peracetic acid, acetic acid, and extraneous organic peroxide material is distilled with added water to provide a distillate of peracetic acid in water solution and a residue of aqueous acetic acid.

EXAMPLES 1 TO 5

In each of Examples 1 to 5, a crude peracetic acid mixture to be rectified was introduced into a one litre, round bottom rotating flash evaporator. The composition of the crude was as shown in Table I. In Example 5, 140 parts per million of picolinic acid (by weight) were added to the crude which was stored at $-20°$ C. for 6 days before distillation.

*Table I*

FEED COMPOSITION

| Example No. | Peracetic Acid | | Acetic Acid | | Acetaldehyde | | Ethyl Acetate | |
|---|---|---|---|---|---|---|---|---|
| | g. | Percent | g. | Percent | g. | Percent | g. | Percent |
| 1 | 228.2 | 6.6 | 39.8 | 1.7 | 63.1 | 1.8 | 3,665.5 | 89.9 |
| 2 | 231.1 | 6.6 | 43.9 | 1.8 | 57.2 | 1.7 | 3,444.3 | 89.9 |
| 3 | 161.7 | 6.6 | 38.0 | 1.7 | 50.4 | 1.7 | 2,642.4 | 90.0 |
| 4 | 262.7 | 7.2 | 61.6 | 1.4 | 70.9 | 1.9 | 3,669.4 | 89.5 |
| 5 | 107.4 | 7.3 | 17.7 | 1.2 | 14.7 | 1.0 | 1,331.2 | 90.5 |

The feed composition does not take into account extraneous organic peroxide material; this material could not be accurately determined, although it was proven to be present. From the amounts found in the residue after distillation, it was estimated that from 0.05 to 0.3% was present in the crude. The crude was fed continuously at a controlled rate shown in Table II from a reservoir through a rotameter, a stopcock, and a glass adaptor to the flash evaporator which was maintained at a constant temperature by means of a water bath. The temperature $T_1$ of the water bath is shown in Table II. The pressure $P_1$, also shown in Table II, was measured at a point located between the evaporator and the column. The evaporator was rotated together with the glass adaptor by means of a rotator mounted with ball bearings. The volume of liquid in the evaporator was kept below 2 cc. to minimize decomposition of peracid prior to vaporization. A glass delivery tube carried the vaporized liquid to the distillation column.

The distillation column consisted of two sections, a bottom and a top section, measuring 100 and 60 cm. respectively. This glass column had an internal diameter of 36 mm. and was packed with 4.5 mm. Berl saddles. The vapor feed from the delivery tube entered the column at a point located between the bottom and the top sections through a glass adaptor. The column was also equipped with standard condensers, a collection funnel, and a still head with magnetically controlled reflux rate. The still head, condensers, and collection funnel were cooled with ethylene glycol. The column was insulated with pipe lagging. The column was also provided at its base with an efficient reboiler in a water bath. Three thermometers, located one in the reboiler, one 120 cm. above the base of the column, and one at the top of the column, gave respectively the temperatures $T_2$, $T_3$, and $T_4$. The pressure $P_2$ was measured at the top of the column. The operating conditions for the evaporator and the distillation column are shown in Table II.

Table II
OPERATING CONDITIONS

| Example No. | Feed Rate, ml./hr. | Temperature (° C.) | | | | Pressure (mm. Hg) | |
|---|---|---|---|---|---|---|---|
| | | $T_1$ | $T_2$ | $T_3$ | $T_4$ | $P_1$ | $P_2$ |
| 1 | 650 | 48–51 | 20 | 9 | 6 | 51 | 38 |
| 2 | 630 | 49–51 | 29 | 11 | 6 | 48 | 36 |
| 3 | 630 | 52–53 | 35 | 6 | 3 | 45 | 31 |
| 4 | 520 | 53–55 | 34 | 9.5 | 5 | 41 | 33 |
| 5 | 510 | 49–54 | 34–39 | 12–13 | 9–11 | 55–59 | 44–46 |

The results of Examples 1 to 5 are shown in Tables III, IV, and V, which show, respectively, the composition of the top distillate, the composition of the liquid bottom draw-off, and the results of the various recoveries of peracetic acid. More specifically, Table V shows the recoveries of peracetic acid in the liquid bottom draw-off expressed as a percent of the peracetic acid in the crude; it also shows the total available oxygen recovered, based on the total amounts of peracetic acid recovered in both liquid bottom draw-off and top distillate expressed as a percent of the peracetic acid in the crude.

Table III
COMPOSITION OF DISTILLATE

| Example No. | Peracetic Acid | | Acetaldehyde | | Ethyl Acetate | |
|---|---|---|---|---|---|---|
| | g. | Percent | g. | Percent | g. | Percent |
| 1 | 1.8 | 0.06 | 51.8 | 1.9 | 2,631.0 | 98.0 |
| 2 | 8.4 | 0.3 | 46.5 | 1.5 | 3,032.6 | 98.2 |
| 3 | 1.0 | 0.05 | 45.2 | 1.8 | 2,367.8 | 98.04 |
| 4 | 2.3 | 0.07 | 56.0 | 1.7 | 3,276.6 | 98.2 |
| 5 | 4.2 | 0.4 | 7.7 | 0.7 | 1,146.9 | 98.9 |

Table IV
COMPOSITION OF LIQUID BOTTOM DRAW-OFF [1]

| Example No. | Peracetic Acid | | Acetic Acid | | Ethyl Acetate | |
|---|---|---|---|---|---|---|
| | g. | Percent | g. | Percent | g. | Percent |
| 1 | 206.9 | 16.7 | 83.4 | 6.7 | 944.7 | 76.4 |
| 2 | 186.6 | 31.9 | 85.0 | 14.5 | 313.9 | 53.6 |
| 3 | 124.4 | 25.3 | 60.7 | 12.2 | 309.0 | 62.5 |
| 4 | 207.8 | 34.9 | 84.8 | 14.3 | 301.9 | 50.8 |
| 5 | 95.0 | 21.1 | 33.1 | 7.3 | 323.0 | 71.6 |

[1] The liquid bottom draw-off also contains traces of acetaldehyde and 1–2 percent extraneous organic peroxide material.

In Example 5, 150 g. ethyl acetate was used to flush the column near the end of operation and it was recovered partly in the distillate fraction and partly in the liquid bottom draw-off fraction.

Table V
PERACETIC ACID RECOVERY

| | Ex. 1 | Ex. 2 | Ex. 3 | Ex. 4 | Ex. 5 |
|---|---|---|---|---|---|
| Peracetic Acid Recovery (Percent) | 90.7 | 80.8 | 77.0 | 79.2 | 88.4 |
| Total Available Oxygen (Percent) | 91.5 | 84.4 | 77.5 | 80.1 | 92.4 |

EXAMPLE 6

A crude peracetic acid mixture prepared by oxidation of acetaldehyde and containing no metal compound catalyst was subjected to a batch fractional distillation in the distillation column described in Examples 1–5, modified as follows: the top section was replaced by a section having the same internal diameter and measuring 100 cm. in height; the reboiler was replaced by a 2 litre flask for batch operation, and the flask was surrounded by a heating mantle. The crude mixture weighed 2474.0 g. and contained 2090.4 g. (84.5%) ethyl acetate, 185.6 g. (7.5%) peracetic acid, 168.1 g. (6.8%) acetic acid, 29.9 g. (1.2%) acetaldehyde, and traces of extraneous organic peroxide material. This crude mixture was stabilized by addition of 40 cc. of a solution containing 2.5 g. picolinic acid per 100 cc. of acetic acid.

The stabilized crude mixture was charged to the flask located at the base of the column and was distilled under a vacuum of 33–50 mm. Hg measured at the top of the column. The temperature of the reboiler varied from 15° to 37° C. while the temperature measured at the top of the column was 3–12° C. At the end of the distillation, 230.0 g. water and 276.5 g. ethyl acetate were used to flush the column.

The distillate, weighing 1679.5 g., contained 1671.86 g. (99.54%) ethyl acetate, 7.4 g. (0.44%) acetaldhyde, 0.21 g. (0.01%) acetic acid, and 0.03 g. (0.002%) peracetic acid. The residue contained 996.7 g. consisting of 153.17 g. (15.3%) peracetic acid, 205.11 g. (20.6%) acetic acid, 230.0 g. (23.1%) water, and 408.42 g. (40.9%) ethyl acetate. Some of the acetaldehyde was lost by evaporation through the vacuum system. The recovery of acetic acid in greater amount than that fed indicates that some peracetic acid had decomposed to acetic acid during the distillation. The recovery of peracetic acid, calculated from the total amount of peracetic acid in the residue, was 82.5% of the amount of peracetic acid in the feed.

EXAMPLE 7

One hundred and fifty parts per million of picolinic acid were added to a crude peracetic acid mixture. The picolinic acid was added as a solution containing 0.1 g. picolinic acid per ml. acetic acid. The crude analyzed 5.7% peracetic acid, 5.0% acetic acid, 0.1% acetaldehyde, 89.0% ethyl acetate, traces of cobalt compound catalyst, and about 0.2% extraneous organic peroxide material.

The foregoing crude was fed directly as a liquid feed to the distillation column used in Examples 1 to 5. The pressure at the top of the column was 35–36 mm. Hg. The temperatures in the reboiler, at a middle point in the column, and at the top of the column, were 21–30° C., 6–8° C., and 3–5° C., respectively. A feed rate of about 550 ml. per hour was maintained during the distillation. All the acetaldehyde and 80% of the ethyl acetate were recovered as distillate. The residue was recovered as several separate portions. The portions recovered when equilibrium conditions had been achieved in the distillation analyzed about 32% peracetic acid, 35% acetic acid, and 32% ethyl acetate, with traces of cobalt compound catalyst, and from 1 to 2% extraneous organic peroxide material; before equilibrium conditions were reached, and in the final stages of the distillation while the column was being flushed with ethyl acetate, the residue portions analyzed as low as 18% peracetic acid, 15% acetic acid and as high as 66% ethyl acetate. The recovery of peracetic acid, calculated from the total amount of peracetic acid in the residue, was 92.7% of the amount of peracetic acid in the feed.

EXAMPLE 8

A mixture of 621.2 g. acetaldehyde and 5026.3 g. ethyl acetate was reacted in a continuous manner with oxygen in an oxidation kettle in the presence of catalytic amounts of $CoCl_2 \cdot 6H_2O$. The catalyst was added as a solution in 1765.5 g. ethyl acetate. The temperature of the oxidation kettle was maintained at 32–35.5° C.

The oxidation product contained from 7.1 to 7.4% peracetic acid, from 1.4 to 2.2% acetic acid, from 1.0 to 1.8% acetaldehyde, catalytic amounts of $CoCl_2 \cdot 6H_2O$, traces of extraneous organic peroxide material, balance ethyl acetate. This oxidation product was stabilized by addition of 84 g. of a solution containing 2.5 g. picolinic acid per 100 g. acetic acid. The stabilized oxidation product was flash evaporated in a continuous manner and the flash evaporated vapor was continuously distilled in an all-glass fractional distillation column measuring 272 cm. in height, 5 cm. in internal diameter, and packed with 4 mm. Berl saddles. The crude mixture was fed from the flash evaporator to the column through a glass conduit and entered the column at a point located about 91 cm. above its base. The column was also equipped at its base with an efficient reboiler, and a continuous liquid draw-off for reboiler residue. The flash evaporator was heated by heat-exchange with water at 78–81° C. The reboiler was heated by heat-exchange with water at 70–86° C. Other temperatures and pressures measured during the distillation were:

$T_1=31-36°$ C.     $P_1=49-70$ mm. Hg
$T_2=42-50°$ C.     $P_2=50-73$ mm. Hg
$T_3=7-14°$ C.       $P_3=28-50$ mm. Hg $T_1$ and $P_1$ represent respectively the temperature and the pressure measured between the flash evaporator and the distillation column. $T_2$ and $P_2$ represent respectively the temperature and the pressure measured at the base of the distillation column, above the reboiler. $T_3$ and $P_3$ represent respectively the temperature and the pressure measured near the top of the column. The reflux to draw-off ratio was magnetically controlled and was maintained at about 1:2.

The distillate contained 5225.1 g. ethyl acetate, 79.2 g. acetaldehyde, and 3.5 g. acetic acid. The reboiler residue was accumulated in six portions and the composition of each portion of this residue which was free of acetaldehyde, is shown in Table VI.

945 g. ethyl acetate. The washings thus obtained, combined with the material which was drawn off from the oxidation kettle and analyzed to observe the progress of the oxidation and with organic material condensed from the effluent gas, weighed 2674.7 g. and contained 174.5 g. (6.5%) peracetic acid, 121.9 g. (4.5%) acetic acid, 56.2 g. (2.1%) acetaldehyde, 1.2 g. (0.04%) extraneous organic peroxide material, and 2320.9 g. (86.8%) ethyl acetate. The recovery of peracetic acid, calculated from the total amount of peracetic acid in the reboiler residue, was 47.7% of the amount of peracetic acid theoretically obtainable from 485 g. acetaldehyde, which is the total obtained by difference between the amount of acetaldehyde fed and the amount of acetaldehyde recovered.

The product obtained by distillation of the crude, as shown in Examples 1 to 7, generally contains about 30–60% organic liquid diluent, 20–40% peracetic acid, 15–35% acetic acid, and 1–2% extraneous organic peroxide material. Peracetic acid free from organic liquid diluent can be obtained either by direct distillation, as shown in Examples 8 and 9, or by addition of water and distillation of the organic liquid diluent-water azeotrope as shown in Examples 10 and 11. Batch distillations or continuous (liquid or vapor feed) distillations are equally practicable.

EXAMPLES 9 TO 11

For Examples 9 to 11, the composition of the mixture to be rectified is shown in Table VII; for Examples 10 and 11, the composition includes the water added for formation of the azeotrope with the diluent. In these examples, the mixture was flash evaporated and fractionated in the apparatus described in Examples 1 to 5. The flash evaporation was carried out to ensure that all traces of metal compound catalyst were removed from the solution. The vapors from the evaporator were fed directly to the still in the manner described in Examples 1 to 5.

*Table VI*

| Residue Portion | Weight (g.) | Composition | | | | | | | |
|---|---|---|---|---|---|---|---|---|---|
| | | $CH_3COOOH$ | | $CH_3COOH$ | | Organic Peroxide [1] | | Ethyl Acetate | |
| | | Percent | g. | Percent | g. | Percent | g. | Percent | g. |
| 1 | 127 | 14.3 | 18.2 | 34.7 | 44.1 | 0.56 | 0.7 | 50.5 | 64.0 |
| 2 | 128.5 | 41.3 | 53.1 | 42.9 | 55.1 | 0.73 | 0.9 | 15.1 | 19.4 |
| 3 | 102.0 | 47.8 | 48.8 | 56.8 | 58.0 | 0.87 | 0.9 | 0 | 0 |
| 4 | 140.0 | 47.6 | 66.6 | 53.6 | 75.0 | 1.19 | 1.6 | 0 | 0 |
| 5 | 59.5 | 47.8 | 28.4 | 53.4 | 31.8 | 0.75 | 0.4 | 0 | 0 |
| 6 | 33.5 | 27.0 | 9.0 | 17.1 | 5.7 | 1 | 0 | 55.9 | 18.8 |

[1] Calculated as acetyl peroxide.

This continuous distillation demonstrates the practicability of removing acetaldehyde and ethyl acetate from the crude mixture in a single continuous distillation. Each portion recovered in the reboiler residue during this distillation contained less than 1% of the total ethyl acetate in the crude mixture, and the middle portions, recovered after steady conditions of operation had been attained, contained no ethyl acetate, as can be seen from Table VI.

At the end of operation, the column was flushed with

*Table VII*

FEED COMPOSITION

| Ex. No. | Peracetic Acid | | Acetic Acid | | Ethyl Acetate | | Water | | Organic Peroxide [1] | |
|---|---|---|---|---|---|---|---|---|---|---|
| | g. | Percent | g. | Percent | g. | Percent | g. | Percent | g. | Percent |
| 9 | 304.9 | 35.1 | 228.7 | 26.3 | 336.3 | 36.6 | 0 | 0 | 17.4 | 2.0 |
| 10 | 303.4 | 19.7 | 280.3 | 18.2 | 858.0 | 55.7 | 70.7 | 4.6 | 27.7 | 1.8 |
| 11 | 262.4 | 17.3 | 217.2 | 12.3 | 761.0 | 61.8 | 91.6 | 6.6 | 29.4 | 2.0 |

[1] Calculated as acetyl peroxide.

It will be noted that the amount of water added in Examples 10 and 11 was greatly in excess of the amount required to form the ethyl acetate-water azeotrope (4% water–96% ethyl acetate). The excess water was added to expedite the hydrolysis of the extraneous organic peroxide material present. The operating conditions for these three distillations are shown in Table VIII.

Table VIII
OPERATING CONDITIONS

| Example No. | Feed ml./hr. Rate | Temperature (° C.) | | | | Pressure (mm.Hg) | |
|---|---|---|---|---|---|---|---|
| | | $T_1$ | $T_2$ | $T_3$ | $T_4$ | $P_1$ | $P_2$ |
| 9 | 120–300 | 58–61 | 29 | 22 | 8.2 | 25 | 21 |
| 10 | 320 | 61–68 | 39–44 | 14–15 | 11–12 | 63 | 55 |
| 11 | 270 | 65–74 | 44–45 | 14–15 | 12–13 | 65 | 57–60 |

$T_1$=Temperature in evaporator bath
$T_2$=Temperature at base of column
$T_3$=Temperature 120 cm. above base of column
$T_4$=Temperature at the top of the column
$P_1$=Pressure in evaporator
$P_2$=Pressure at the top of the column In Example 9, 327.4 g. ethyl acetate was used to flush the column and the reboiler at the end of operation. For Example 9, the residue contained 269.0 g. (46%) peracetic acid, 204.4 g. (35%) acetic acid, 110.7 g. (19%) ethyl acetate, and some extraneous organic peroxide material. The distillate contained 518.5 g. (95.4%) ethyl acetate, and 25.2 g. (4.6%) peracetic acid. The recovery of peracetic acid, calculated from the amount of peracetic acid in the residue, was 88.3% of the amount of peracetic acid in the feed. For this example, the organic peroxide material was not determined quantitatively. It can be observed, from this example, that, with an efficient fractionation column, the organic liquid diluent can be distilled directly from the residue obtained after separation of acetaldehyde and in the same apparatus if the process is operated batchwise.

The results of Examples 10 and 11 are shown in Table IX. More specifically, Table IX shows the composition of the distillate, the composition of the residue, and the recovery of peracetic acid in the residue expressed as a percent of the peracetic acid in the feed.

Table IX

| | Ex. 10 | Ex. 11 |
|---|---|---|
| Composition of Distillate: | | |
| Ethyl Acetate | 869 g. (96%) | 766 g. (96%). |
| Water | 36.1 g. (4%) | 31.0 g. (4%). |
| Composition of Residue: | | |
| Peracetic Acid | 260.9 g. (37–42%) | 254.2 g. (37–40%). |
| Acetic Acid | 337.9 g. (48–52%) | 312.6 g. (46–51%) |
| Organic Peroxide | 25.7 g. (1–5%) | 19.4 g. (2–3%). |
| Water | 62.0 g. (7–9%) | 64.5 g. (9–10%). |
| Ethyl Acetate | Trace | Trace. |
| Peracetic Acid Recovery | 86.0% | 96.8%. |

In connection with the results obtained in Examples 9–11, it should be noted that peracetic acid and acetic acid can be formed by hydrolysis of diacetyl peroxide, which has been identified as the main component of the extraneous organic peroxide material in the residue. In Examples 10 and 11, it was found that 8% and 34% of the original amount of organic peroxide material calculated as diacetyl peroxide had been hydrolyzed. If small amounts of acetaldehyde are present, these can react with peracetic acid to form acetic acid. Finally, peracetic acid can react, by decomposition, to produce acetic acid. It is believed that at least some of the above reactions occur during the distillation and can account for the excess acetic acid recovered.

The mixture obtained by separation of acetaldehyde and nonreactive organic liquid diluent from the crude mixture as shown in Examples 1 to 11, generally contains 35–50% peracetic acid, 35–50% acetic acid, up to 5% extraneous organic peroxide material, and in some cases (see Examples 10 and 11) up to 10% water. Peracetic acid can be further concentrated and recovered from this mixture by adjusting the water content of the mixture and distilling water and peracetic acid therefrom under vacuum. The residue thereof is aqueous acetic acid from which acetic acid can be recovered if desired. For this distillation of water and peracetic acid, batch distillation and continuous (liquid or vapor feed) distillation are equally practicable. If the mixture still contains some metal compound catalyst, it is also desirable to perform a flash evaporation before such distillation.

EXAMPLE 12

In Example 12, the same distillation column as that described in Example 6 was used. After addition of water, the mixture to be distilled contained 246.7 g. (31.5%) peracetic acid, 271.2 g. (34.7%) water, 261.0 g. (33.3%) acetic acid, 2.6 g. (0.5%) hydrogen peroxide, and traces of extraneous organic peroxide. This mixture was distilled under a vacuum of 55–60 mm. Hg, measured at the top of the column. The temperature of the reboiler varied from 44 to 56° C. while the temperature measured at the top of the column was 36–40° C. A ratio of reflux to draw-off of from 2:1 to 3:1 was maintained during the distillation. Table X shows the composition of each fraction of the distillate collected and the composition of the residue. From Table X it can

Table X

| Sample | Weight (g.) | Composition | | | | | | | |
|---|---|---|---|---|---|---|---|---|---|
| | | $CH_3COOOH$ | | $CH_3COOH$ | | $H_2O$ | | $H_2O_2$ | |
| | | Percent | g. | Percent | g. | Percent | g. | Percent | g. |
| Distillate: | | | | | | | | | |
| Fraction 1 | 43.5 | 43.9 | 19.1 | | | 56.1 | 24.4 | | |
| Fraction 2 | 55.5 | 51.9 | 28.8 | | | 48.1 | 26.7 | | |
| Fraction 3 | 126.3 | 53.8 | 68.0 | | | 46.2 | 58.4 | | |
| Fraction 4 | 125.3 | 40.3 | 50.5 | | | 59.7 | 74.8 | | |
| Fraction 5 | 78.3 | 27.0 | 21.1 | 0.5 | 0.4 | 72.5 | 56.0 | | |
| Fraction 6 | 112.4 | 17.6 | 19.8 | 9.3 | 10.5 | 73.1 | 82.1 | | |
| Fraction 7 | 84.0 | 13.0 | 10.9 | 11.4 | 9.6 | 75.6 | 63.5 | | |
| Residue | 516.5 | 1.8 | 9.3 | 47.9 | 247.4 | 49.9 | 257.7 | 0.4 | 2.1 | be seen that 67% of the peracetic acid originally present was collected in the distillate before any acetic acid was detected. At that point, three 50 cc. portions of water were added from a point located at about the middle of the column. Finally, after the distillation was completed, the column was rinsed with 250 cc. water and the washings collected with the residue which was analyzed.

The recovery of peracetic acid, calculated from the amount of peracetic acid in the distillate, was 88.4% of the amount of peracetic acid in the feed.

From the foregoing description, it can be seen that the present invention provides a simple and economical process for the recovery of a stable, concentrated aqueous solution of peracetic acid from dilute, crude non aqueous solutions containing the same.

It will be understood that many variations of this process may be made without departing from the scope of this invention which is as defined in the following claims.

What is claimed is:

1. A process for the recovery of a concentrated aqueous solution of peracetic acid from a crude mixture containing acetaldehyde, peracetic acid, acetic acid, extraneous organic peroxide material, and a nonreactive organic liquid diluent satisfying at least one of the following two conditions: (a) having a boiling point at atmospheric pressure between 40° C. and 110° C. and (b) forming with water a binary azeotrope of boiling point between 40° C. and 110° C. at atmospheric pressure, said process consisting essentially of (1) separating acetaldehyde and the nonreactive organic liquid diluent as distillate from a residue of peracetic acid, acetic acid, and the organic peroxide material by vacuum fractional distillation, (2) adding water to the residue in an amount to provide a mole ratio of water to peracetic acid of from 2.0 to 8.5, (3) fractionally distilling said aqueous residue under vacuum whereby at least part of the organic peroxide material present in the mixture is hydrolyzed, and (4) recovering a concentrated aqueous solution of peracetic acid substantially free of acetic acid as distillate and aqueous acetic acid as residue, said process being carried out at an absolute pressure below 200 mm. Hg.

2. A process as claimed in claim 1, said process being carried out at an absolute pressure below 70 mm. Hg.

3. A process as claimed in claim 2, in which water is added to the residue of peracetic acid, acetic acid, and the organic peroxide material to provide a mole ratio of water to peracetic acid of from 3.0 to 4.0.

4. A process as claimed in claim 3, in which said nonreactive organic liquid diluent is an alkyl acetate.

5. A process as claimed in claim 4, in which said nonreactive organic liquid diluent forms with water a binary azeotrope of boiling point between 40° C. and 110° C. at atmospheric pressure and in which acetaldehyde and the organic liquid diluent are separated by (1) fractionating the crude mixture under vacuum to separate a distillate of acetaldehyde from a residue of peracetic acid, acetic acid, nonreactive organic liquid diluent, and organic peroxide material, (2) adding water to said residue in sufficient amount to form, upon vacuum distillation, said azeotrope of nonreactive organic liquid diluent and water, (3) azeotropically distilling said aqueous residue under vacuum whereby some of the organic peroxide material present in the residue is hydrolyzed, and (4) recovering a distillate of said azeotrope and a residue of peracetic acid, acetic acid, water, and extraneous organic peroxide material.

6. A process for the recovery of a concentrated aqueous solution of peracetic acid from a crude mixture containing acetaldehyde, peracetic acid, acetic acid, extraneous organic peroxide material, and a nonreactive organic liquid diluent satisfying at least one of the following two conditions: (a) having a boiling point at atmospheric pressure between 40° C. and 110° C., and (b) forming with water a binary azeotrope of boiling point between 40° C. and 110° C. of atmospheric pressure, said process consisting essentially of (1) adding a stabilizer for peracetic acid to said crude mixture, (2) separating acetaldehyde and the organic liquid diluent as distillate from a residue of peracetic acid, acetic acid, and the organic peroxide material by vacuum fractional distillation of said stabilized crude mixture, (3) adding water to the residue in an amount to provide a mole ratio of water to peracetic acid of from 2.0 to 8.5, (4) fractionally distilling said aqueous residue under vacuum whereby at least part of the organic peroxide material present in the mixture is hydrolyzed, and (5) recovering a concentrated aqueous solution of peracetic acid substantially free of acetic acid as distillate and aqueous acetic acid as residue, said process being carried out at an absolute pressure below 200 mm. Hg.

7. A process as claimed in claim 6, in which said stabilizer is selected from the group consisting of picolinic acid, quinaldic acid, and 8-hydroxy quinoline.

8. A process for the recovery of a concentrated aqueous solution of peracetic acid from a crude mixture containing acetaldehyde, peracetic acid, acetic acid, metal compound catalyst, extraneous organic peroxide material, and a nonreactive organic liquid diluent satisfying at least one of the following two conditions: (a) having a boiling point at atmospheric pressure between 40° C. and 110° C., and (b) forming with water a binary azeotrope of boiling point between 40° C. and 110° C. at atmospheric pressure, said process consisting essentially of (1) flash evaporating said crude mixture under vacuum to separate a nonvolatile residue of said metal compound catalyst from a volatile mixture of acetaldehyde, peracetic acid, acetic acid, extraneous organic peroxide material, and nonreactive organic liquid diluent, (2) separating acetaldehyde and the organic liquid diluent as distillate from a residue of peracetic acid, acetic acid, and the organic peroxide material by vacuum fractional distillation of said mixture, (3) adding water to the residue in an amount to provide a mole ratio of water to peracetic acid of from 2.0 to 8.5, (4) fractionally distilling said aqueous residue under vacuum whereby at least part of the organic peroxide material present in the mixture is hydrolyzed, and (5) recovering a concentrated aqueous solution of peracetic acid substantially free of acetic acid as distillate and aqueous acetic acid as residue, said process being carried out at an absolute pressure below 200 mm. Hg.

9. A process as claimed in claim 8 further including adding a stabilizer for peracetic acid to said crude mixture prior to separating acetaldehyde and the organic liquid diluent, said stabilizer being selected from the group consisting of picolinic acid, quinaldic acid, and 8-hydroxy quinoline.

10. A process for the recovery of a concentrated aqueous solution of peracetic acid from a crude mixture containing acetaldehyde, peracetic acid, acetic acid, metal compound catalyst, extraneous organic peroxide material, and a nonreactive organic liquid diluent satisfying at least one of the following two conditions: (a) having a boiling point at atmospheric pressure between 40° C. and 110° C., and (b) forming with water a binary azeotrope of boiling point between 40° C. and 110° C. at atmospheric pressure, said process consisting essentially of (1) adding a stabilizer for peracetic acid to said crude mixture, (2) separating acetaldehyde and the nonreactive organic liquid diluent as distillate from a residue of peracetic acid, acetic acid, metal compound catalyst, and the organic peroxide material by vacuum fractional distillation of said stabilized crude mixture, (3) flash evaporating said residue to separate a nonvolatile residue of said metal compound catalyst from a volatile mixture of peracetic acid, acetic acid, and organic peroxide material, (4) adding water to said volatile mixture in an amount to provide a mole ratio of water to peracetic acid of from 2.0 to 8.5, (5) fractionally distilling said aqueous volatile mixture under vacuum whereby at least part of the organic peroxide material present in the mixture is hydrolyzed, and (6) recovering a concentrated aqueous solution of peracetic acid substantially free of acetic acid as distillate and aqueous acetic acid as residue, said process being carried out at an absolute pressure below 200 mm. Hg.

References Cited in the file of this patent
UNITED STATES PATENTS

| | | |
|---|---|---|
| 2,624,655 | Greenspan | Jan. 6, 1953 |
| 2,802,025 | Weitbrecht et al. | Aug. 6, 1957 |
| 2,830,080 | Stevens | Apr. 8, 1958 |
| 2,833,813 | Wallace | May 6, 1958 |
| 2,877,266 | Korach | Mar. 10, 1959 |